United States Patent
Genet

(10) Patent No.: US 9,415,750 B2
(45) Date of Patent: Aug. 16, 2016

(54) WINDSCREEN WIPER DEVICE

(75) Inventor: Sophie Genet, Saint Laurent sur Othain (FR)

(73) Assignee: Federal-Mogul S.A., Aubange (BE)

(*) Notice: Subject to any disclaimer, the term of this patent is extended or adjusted under 35 U.S.C. 154(b) by 203 days.

(21) Appl. No.: 13/983,212

(22) PCT Filed: Feb. 2, 2011

(86) PCT No.: PCT/EP2011/051489
§ 371 (c)(1),
(2), (4) Date: Aug. 1, 2013

(87) PCT Pub. No.: WO2012/103944
PCT Pub. Date: Aug. 9, 2012

(65) Prior Publication Data
US 2013/0312209 A1 Nov. 28, 2013

(51) Int. Cl.
*B60S 1/40* (2006.01)
*B60S 1/38* (2006.01)

(52) U.S. Cl.
CPC ............. *B60S 1/4006* (2013.01); *B60S 1/3856* (2013.01); *B60S 1/4019* (2013.01); *B60S 2001/4032* (2013.01)

(58) Field of Classification Search
CPC .... B60S 1/4006; B60S 1/4009; B60S 1/4016; B60S 1/4019; B60S 2001/4022; B60S 2001/4029; B60S 2001/4032; B60S 1/3856
See application file for complete search history.

(56) References Cited

U.S. PATENT DOCUMENTS 4,179,767 A   12/1979  Weiler et al.
2004/0123414 A1   7/2004  Lee

FOREIGN PATENT DOCUMENTS

| EP | 0329515 A1 | 8/1989 |
| EP | 1854685 A1 | 11/2007 |
| GB | 2256790 A | 12/1992 |
| KR | 10-0894436 | * 4/2009 |

* cited by examiner

*Primary Examiner* — Gary Graham
(74) *Attorney, Agent, or Firm* — Robert L. Stearns; Dickinson Wright, PLLC

(57) ABSTRACT

A windscreen wiper device of the "flat blade type" comprising an elastic, elongated carrier element, as well as an elongated wiper blade of a flexible material and a connecting device for a oscillating arm comprising two longitudinal arm sections connected to each other by means of a curved intermediate section and a resilient tongue engaging in a correspondingly shaped hole provided in the oscillating arm, wherein the resilient tongue comprises at least two, spaced-apart, downwardly extending protrusions, wherein a first protrusion is adapted to engage in a correspondingly shaped hole provided in an oscillating arm of a first type, and wherein a second protrusion is adapted to engage in a correspondingly shaped hole provided in an oscillating arm of a second type, the oscillating arms of the first and the second types mutually differing in the distance between their respective longitudinal arm sections.

7 Claims, 2 Drawing Sheets

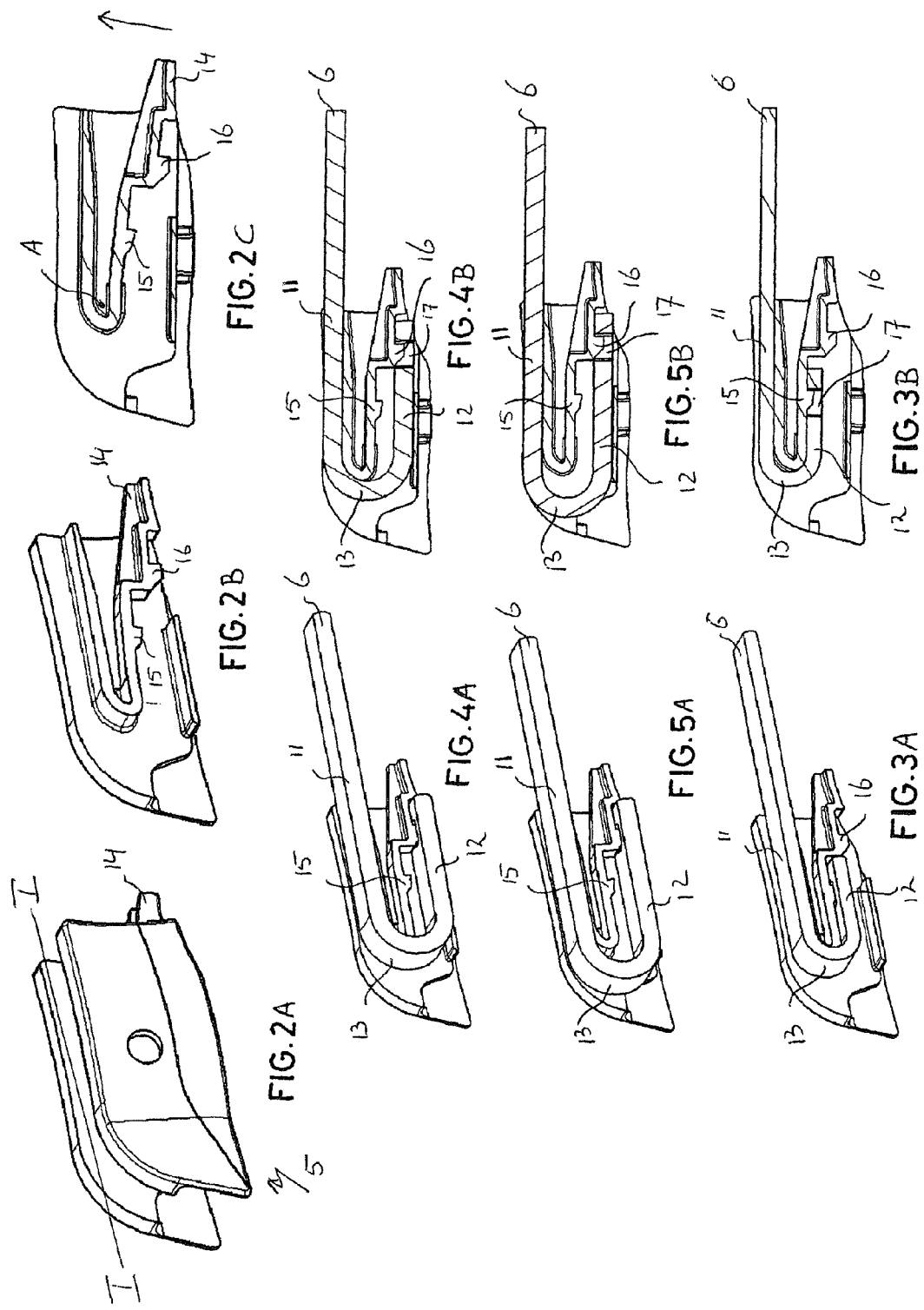

WINDSCREEN WIPER DEVICE

BACKGROUND OF THE INVENTION

1. Technical Field

The present invention relates to a windscreen wiper device of the "flat blade type" comprising an elastic, elongated carrier element, as well as an elongated wiper blade of a flexible material, which can be placed in abutment with a windscreen to be wiped, which wiper blade includes at least one longitudinal groove, in which groove a longitudinal strip of the carrier element is disposed, which windscreen wiper device comprises a connecting device for a oscillating arm comprising two longitudinal arm sections connected to each other by means of a curved intermediate section, wherein the oscillating arm can be pivotally connected to the connecting device about a pivot axis. Such a connecting device is also called "connector".

2. Related Art

U.S. Pat. No. 4,179,767 (Robert Bosch GmbH) describes a windscreen wiper device designed as a traditional wiper device, wherein use is made of several yokes pivotally connected to each other. In this prior art windscreen wiper device a joint part connected to the connecting device comprises one resilient tongue engaging in a correspondingly shaped hole provided in the hook-shaped oscillating arm. In order to connect the wiper blade onto the oscillating arm, the resilient tongue is initially pushed in against a spring force—as if it were a push button—and then allowed to spring back into the hole provided in the oscillating arm, thus snapping, that is clipping the resilient tongue into the hole. By subsequently pushing in again the resilient tongue against the spring force, the wiper blade may be released from the oscillating arm.

SUMMARY OF THE INVENTION

The object of the invention is to provide an improved windscreen wiper device of the "flat blade type", wherein no use is made of several yokes pivotally connected to each other, but wherein the wiper blade is biassed by the carrier element, as a result of which it exhibits a specific curvature.

In order to accomplish that objective, a windscreen wiper device of the type referred to in the introduction is characterized according to the invention in that the connecting device comprises a resilient tongue engaging in a correspondingly shaped hole provided in the oscillating arm, wherein the resilient tongue comprises at least two, spaced-apart, downwardly extending protrusions, wherein a first protrusion of the protrusions is adapted to engage in a correspondingly shaped hole provided in an oscillating arm of a first type, and wherein a second protrusion of the protrusions is adapted to engage in a correspondingly shaped hole provided in an oscillating arm of a second type, the oscillating arms of the first and the second types mutually differing in the distance between their respective longitudinal arm sections. the connecting device, also called "connector", is made of plastic (including any synthetic material having some flexibility).

the connecting device acts as a base part, wherein the connecting device is preferably fixedly connected to the longitudinal strips through a welding, brazing ("soldering"), gluing or clamping operation. In the alternative, the connecting device is clamped onto the flexible material of the wiper blade, particularly in case the latter is equipped with a central longitudinal groove for the carrier element. Particularly the connecting device is a universal connection part for different types of hook-shaped oscillating arms, that is oscillating arms mutually differing in the distance between their respective longitudinal arm sections and thus in the "width" of their respective intermediate curved section. Only one type of the connecting device may be used for each different type of hook-shaped oscillating arm. The advantage achieved by the invention is that a unit consisting of the wiper blade and the connecting device connected thereto can be manufactured for each and every type of hook-shaped oscillating arm. Thus, a universal connection between the wiper blade and the oscillating arm is obtained, so that car drivers are given the possibility to buy also non-original cheap wiper blades fitting the original oscillating arms on their cars. Obviously, no separate joint part is used in the present invention, so that less parts are now responsible for a reliable connection between the wiper blade and the oscillating arm.

In one preferred embodiment of a windscreen wiper device in accordance with the invention the protrusions mutually differ in height. Particularly, the resilient tongue comprises a step-like profile, wherein the protrusions extend downwardly from steps of the profile mutually differing in height. Accordingly, the protrusions are arranged to snap or clip into correspondingly shapes holes in the oscillating arms of the first and the second types, respectively.

In another preferred embodiment of a windscreen wiper device according to the invention the second protrusion is also adapted to engage in a correspondingly shaped hole provided in an oscillating arm of a third type, the oscillating arms of the second and the third types mutually differing in the length of their respective longitudinal arm sections that face towards the windscreen to be wiped. Hence, the connecting device is a universal connection part for different types of hook-shaped oscillating arms, that is oscillating arms (i) mutually differing in the distance between their respective longitudinal arm sections and thus in the "width" of their respective intermediate curved section, as well as (ii) mutually differing in the length of their respective longitudinal arm sections that face towards the windscreen to be wiped.

Particularly, the resilient tongue is rotatable along a hinge axis between a first position, wherein the downwardly extending protrusions are adapted to engage in the correspondingly shaped holes provided in the oscillating arms of the first type, of the second type and of the third type, respectively, for retaining the wiper blade onto the oscillating arms of the first type, of the second type and of the third type, respectively; and a second position,
    wherein the downwardly extending protrusions are adapted to disengage from the correspondingly shaped holes provided in the oscillating arms of the first type, of the second type, and of the third type, respectively, for releasing the wiper blade from the oscillating arms of the first type, of the second type and of the third type, respectively.

In another preferred embodiment of a windscreen wiper device in accordance with the invention the upwardly extending protrusion and the downwardly extending protrusion are provided with an inclined upper surface. Sliding a longitudinal arm section of the oscillating arm of the first or the second type that faces towards the windscreen to be wiped, onto the connecting device will thus not take too much force.

In another preferred embodiment of a windscreen wiper device according to the invention the connecting device has an at least substantially U-shaped cross-section, wherein the resilient tongue extends in longitudinal direction between legs of the U-shaped cross-section.

In another preferred embodiment of a windscreen wiper device in accordance with the invention the correspondingly shaped hole is provided in a longitudinal arm section of the oscillating arm of the first, of the second type and of the third type, that faces towards the windscreen to be wiped. the hole may have a closed circumference. Such a closed hole enhances the retention of the connection device onto the oscillating arm in all possible directions, particularly both horizontally and vertically. In the alternative, the hole has a non-closed circumference.

THE DRAWINGS

The invention will now be explained in more detail with reference to figures illustrated in a drawing, wherein:

FIGS. 2a, 2b and 2c show a connecting device used in the windscreen wiper device of FIG. 1 in a perspective view (FIG. 2a), in a cross-sectional and perspective view along the line I-I of FIG. 2a (FIG. 2b), and in a cross-sectional and side view along the line I-I of FIG. 2a (FIG. 2c), respectively;

Figure 1:
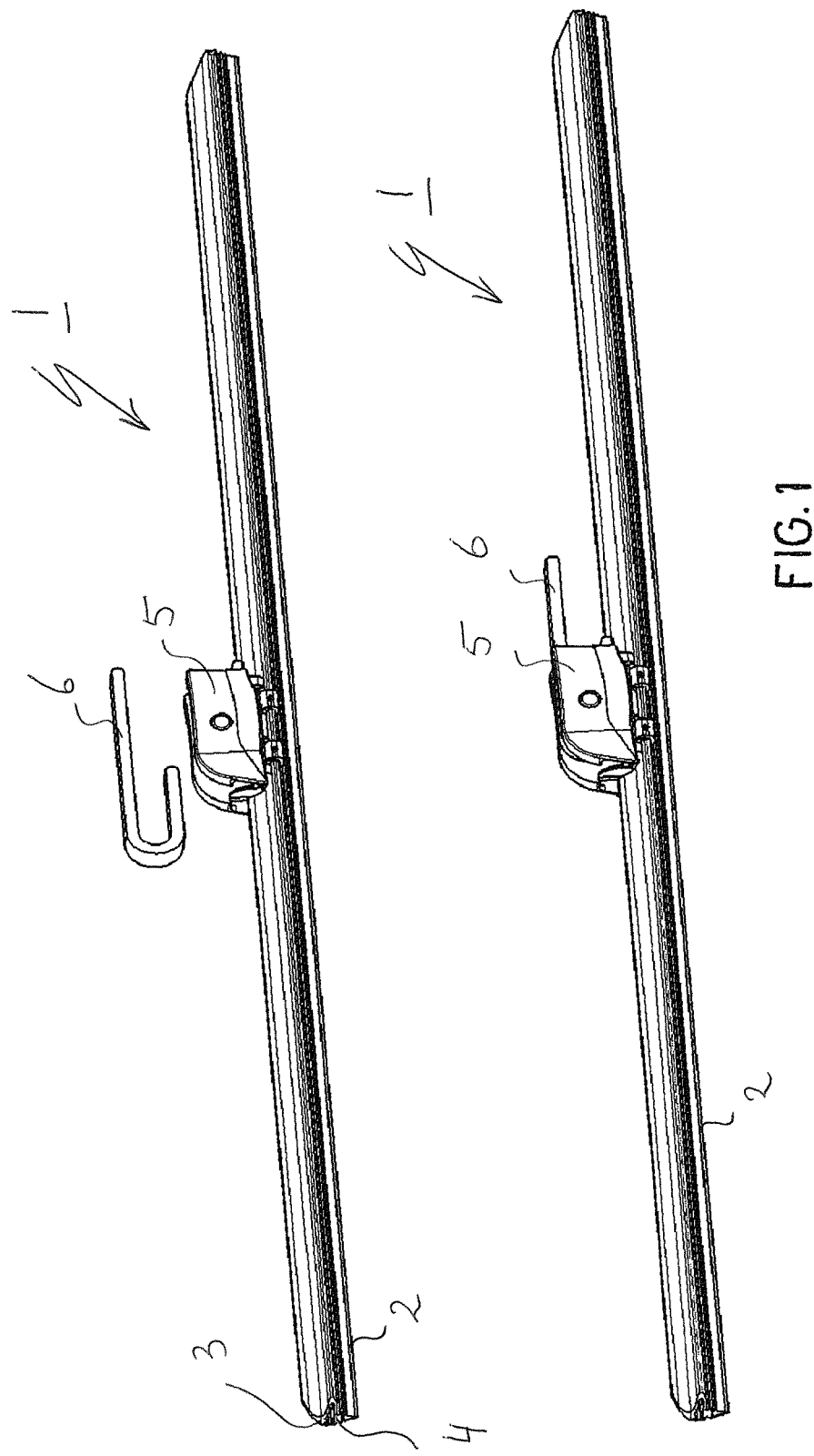
FIG. 1 is a perspective, schematic view of a windscreen wiper device of the "flat blade type" according to a preferred embodiment of the invention.

FIGS. 3a and 3b, FIGS. 4a and 4b, as well as FIGS. 5a and 5b correspond to FIGS. 2b and 2c, respectively, while depicting three different types of oscillating arms.

DETAILED DESCRIPTION

FIG. 1 shows a "flat blade type" of a windscreen wiper device 1 according to the invention. the windscreen wiper device 1 is built up of an elastomeric wiper blade 2, comprising a central longitudinal groove 3. A longitudinal strip 4 made of spring band steel, is fitted in the longitudinal groove 3. the strip 4 forms a flexible carrier element for the wiper blade 2, as it were, which is thus biassed in a curved position (the curvature in operative position being that of a windscreen to be wiped). Ends of the strip 4/wiper blade 2 may be connected on either side of the windscreen wiper device 1 to a connecting piece functioning as clamping members (not shown). The connecting pieces could be separate constructional elements, which may be form-locked ("positive locking" or "having a positive fit") or force-locked to the ends of the strip 4/wiper blade 2. In another preferred embodiment, the connecting pieces are in one piece with the strip 4 made of spring band steel.

The windscreen wiper device 1 is furthermore built up of a connecting device 5 of plastic material for an oscillating arm 6. Alternatively, the connecting device 5 may also be made of metal, such as steel or aluminum. The connecting device 5 is particularly welded, brazed ("soldered"), glued or clamped onto the strips 4. The oscillating arm 6 is pivotally connected to the unit about a pivot axis near one end, as will be described hereunder. The connecting device 5 is a universal part in the sense that it can be used for each and every type of oscillating arm 6, that is, for example, for the oscillating arms as shown in FIGS. 3, 4 and 5. As can be seen from FIGS. 3, 4 and 5, the oscillating arm 6 includes two parallel longitudinal arm sections 11,12 connected to each other by means of a curved intermediate section 13, wherein the sections 11,12,13 are in one piece.

With reference to FIGS. 1 and 2 the connector 5 comprises one resilient tongue 14 comprising (in one piece therewith) two downwardly extending protrusions 15,16. the downwardly extending protrusion 15 is adapted to engage in a correspondingly shaped hole 17 (having a closed circumference) provided in an oscillating arm 6 of a first type (FIGS. 3a and 3b), wherein the downwardly extending protrusion 16 is adapted to engage in a correspondingly shaped hole 17 (having a closed circumference) provided in an oscillating arm 6 of a second type (FIGS. 4a and 4b). As can be seen from FIGS. 3a, 3b and FIGS. 4a, 4b, the oscillating arms 6 of the first and the second types mutually differ in the distance between their respective parallel longitudinal arm sections 11,12. In addition, the protrusion 16 is also adapted to engage in a correspondingly shaped hole 17 (having a closed circumference) provided in an oscillating arm 6 of a third type (FIGS. 5a and 5b). As can be seen from FIGS. 4a, 4b and FIGS. 5a, 5b, the oscillating arms 6 of the second and the third types mutually differ in the in the length of their respective longitudinal arm sections 12 that face towards the windscreen to be wiped. The resilient tongue 14 extending in longitudinal direction between vertical walls of the connecting device 5 is hingeable around a hinge axis A. As can be seen from FIGS. 2b and 2c, the resilient tongue comprises a step-like profile, wherein the protrusions 15,16 are located on different steps of the profile.

The connecting device 5 can be easily slid on the hook-shaped end of the oscillating arm 6. During this sliding movement the resilient tongue 14 is initially pushed in against a spring force (in the direction of the arrow) and then allowed to spring back into the hole 17, thus snapping, that is clipping the protrusion 15 or the protrusion 16 into the hole 17 (FIGS. 3, 4 and 5), dependent on the type of oscillating arm 6. The downwardly extending protrusions 15,16 are provided with an inclined upper surface, so that sliding the connecting device 5 onto the longitudinal arm section 12 of the oscillating arm 6 of the first, the second or the third type will not take too much force. By subsequently pushing in again the protrusion 15 or the protrusion 16 against the spring force (as if it were a push button), the connecting device 5 together with the wiper blade 2 may be released from the oscillating arm 6. Dismounting the connecting device 5 with the wiper blade 2 from the oscillating arm 6 is thus realized by sliding the connecting device together with the wiper blade 2 in a direction away from the oscillating arm 6. The connecting device 5 is a true universal part for several types of oscillating arms 8, as will be clear from FIGS. 3, 4 and 5.

Possibly, a spoiler is furthermore present being made in one piece with the wiper blade 2.

The invention is not restricted to the variants shown in the drawing, but it also extends to other embodiments that fall within the scope of the appended claims.

The invention claimed is:

1. A windscreen wiper device comprising an elastic, elongated carrier element, as well as an elongated wiper blade of a flexible material, which can be placed in abutment with a windscreen to be wiped, which wiper blade includes at least one longitudinal groove, in which groove a longitudinal strip of the carrier element is disposed, which windscreen wiper device comprises a connecting device made as one integral piece for an oscillating arm comprising two longitudinal arm sections connected to each other by means of a curved intermediate section, wherein said connecting device is fixedly connected with said wiper blade or said longitudinal strip, wherein said oscillating arm can be pivotally connected to said connecting device about a pivot axis, wherein said connecting device comprises a resilient tongue engaging in a correspondingly shaped hole provide in said oscillating arm, wherein said resilient tongue comprises at least two, spaced-apart, downwardly extending protrusions wherein a first protrusion of said protrusions is adapted to engage in a correspondingly shaped hole provided in an oscillating arm of a first type, and wherein a second protrusion of said protrusions is adapted to engage in a correspondingly shaped hole provided in an oscillating arm of a second type, said oscillating arms of said first and said second types mutually differing in the distance between their respective longitudinal arm sections, wherein said second protrusion is also adapted to engage in a correspondingly shaped hole provided in an oscillating arm of a third type, said oscillating arms of said second and said third types mutually differing in the length of their respective longitudinal arm sections that face towards the windscreen to be wiped.

2. The windscreen wiper device according to claim 1, wherein said protrusions mutually differ in height.

3. The windscreen wiper device according to claim 1, wherein said resilient tongue comprises a stepped profile, and wherein said protrusions extend downwardly from steps of said profile mutually differing in height.

4. The windscreen wiper device according to claim 1, wherein said resilient tongue is rotatable along a hinge axis between a first position,
   wherein said downwardly extending protrusions are adapted to engage in said correspondingly shaped holes provided in said oscillating arms of said first type, of said second type and of said third type, respectively, for retaining said wiper blade onto said oscillating arms of said first type, of said second type and of said third type, respectively; and a second position,
   wherein said downwardly extending protrusions are adapted to disengage from said correspondingly shaped holes provided in said oscillating arms of said first type, of said second type, and of said third type, respectively, for releasing said wiper blade form said oscillating arms of said first type of said second type and of said third type, respectively.

5. The windscreen wiper device according to claim 1, wherein said downwardly extending protrusions are provided with an inclined upper surface.

6. The windscreen wiper device according to claim 1, wherein said connecting device has an at least substantially U-shaped cross-section, and wherein said resilient tongue extends in longitudinal direction between legs of the U-shaped cross-section.

7. The windscreen wiper device according to claim 1, wherein said correspondingly shaped hole is provided in a longitudinal arm section of said oscillating arm of said first, of said second type and of said third type, that faces towards said windscreen to be wiped.

* * * * *